United States Patent
Callendrier

(12) 
(10) Patent No.: US 6,360,596 B1
(45) Date of Patent: Mar. 26, 2002

(54) WEB TENSION TRANSDUCER

(75) Inventor: Thierry L. Callendrier, Parma, OH (US)

(73) Assignee: Cleveland Motion Controls, Inc., Cleveland, OH (US)

(*) Notice: Subject to any disclaimer, the term of this patent is extended or adjusted under 35 U.S.C. 154(b) by 0 days.

(21) Appl. No.: 09/368,936

(22) Filed: Aug. 5, 1999

(51) Int. Cl.[7] ............................. G01L 5/04; G01L 1/22
(52) U.S. Cl. ................................... 73/159; 73/862.474
(58) Field of Search .......................... 73/862.474, 159, 73/144

(56) References Cited

U.S. PATENT DOCUMENTS

| | | |
|---|---|---|
| 3,260,106 A | 7/1966 | Hull et al. |
| 3,439,761 A | 4/1969 | Laimins |
| 3,589,181 A | 6/1971 | Palmatier et al. |
| 3,724,733 A * | 4/1973 | Schaffer et al. ............... 226/25 |
| 3,763,701 A | 10/1973 | Wright et al. |
| 3,927,560 A | 12/1975 | Farr |
| 4,015,468 A | 4/1977 | Simon |
| 4,052,891 A * | 10/1977 | Bartlett ........................ 73/144 |
| 4,130,014 A | 12/1978 | Eddens |
| 4,152,053 A * | 5/1979 | Menary ....................... 352/130 |
| 4,281,539 A | 8/1981 | Keller |
| 4,326,424 A | 4/1982 | Koenig |
| RE31,312 E | 7/1983 | Eddens |
| 4,674,341 A | 6/1987 | Koenig |
| 4,735,102 A | 4/1988 | Koenig |
| 4,784,004 A | 11/1988 | Ekola |
| 4,796,474 A | 1/1989 | Koenig |
| 4,958,525 A | 9/1990 | Hauer et al. |
| 5,020,381 A | 6/1991 | Bartlett |
| 6,122,978 A * | 9/2000 | Callendrier ............ 73/862.474 |

FOREIGN PATENT DOCUMENTS

| | | |
|---|---|---|
| DE | 25 20 672 | 5/1975 |
| DE | 24 52 925 | 5/1976 |
| EP | 0 299 806 | 1/1989 |
| GB | 1263182 | 2/1972 |

OTHER PUBLICATIONS

"Handbuch der Sensortechnik—Messen mechanischer Grössen" 1990, Dietrich Juckenack, Landsberg/Lech XP002108994.

* cited by examiner

Primary Examiner—Benjamin R. Fuller
Assistant Examiner—Maurice Stevens
(74) Attorney, Agent, or Firm—Vickers, Daniels & Young

(57) ABSTRACT

A web tension transducer for mounting between a stationary fixture and a pillow block rotationally supporting a web roller shaft is provided. The transducer includes a body mounted to said fixture for pivotal movement about a single horizontal axis at one longitudinal end, and having a strain gage mounted in a transverse horizontal slot at the opposite end of said body, thus providing maximum deflection of the strain gage in response to downward force applied to the shaft for measurement of the web tension.

64 Claims, 6 Drawing Sheets

WEB TENSION TRANSDUCER

The present invention relates to the art of force measurement, and more particularly to a transducer for generating electrical signals representative of forces applied to a rotating shaft by a passing web in tension.

The transducer of the present invention finds particular utility when mounted between an underlying stationary fixture and an overlying pillow block including a rotational bearing support for an idler roll in contact with a moving web. In such an application, tension in the web produces downward forces on the roll which are transmitted through the pillow block to the transducer causing movement thereof with respect to the stationary fixture. As a result, the transducer produces electrical signals representing the tension in the web.

In a typical web tension measurement system, the web passes over and is held in contact with an idler roll supported at both ends in the bearing of a pillow block. In this configuration, the tension in the moving web transmits a generally downward force through the shaft and the pillow block to the underlying transducer. Each transducer generates one or more electrical signals representative of the applied force for quantification of the magnitude and in some cases the direction thereof. The resulting transducer output signal is commonly used for monitoring and/or control of the tension in the web using, for example, motor speed servo controls and the like. As the tension in the moving web increases, the applied downward force on the shaft and hence the force on the transducer increases proportionally. As a result, the transducer electrical output signal also increases. Similarly, a decrease in the web tension results in a corresponding decrease in the transducer output signal level. Such tension monitoring and control systems are common in manufacturing applications involving continuous feed materials such as cloth, metals, plastic, and paper manufacturing and printing, as well as in conveyor belt systems and the like, where tension is an important parameter. The transducer generally includes strain gage devices mounted either externally on the transducer body's peripheral surfaces or internally on the inside walls of holes or slots machined in the transducer body. Single or multiple strain gages may be employed in or on the transducer body in various known electrical interconnection configurations such as quarter-bridge, half-bridge, and full-bridge designs. The particular strain gage interconnection configuration is selected based on desired electrical characteristics including the sensitivity which is usually expressed in units of millivolts per volt (mV/V). The strain gage or gages are connected in bridge fashion with a DC excitation power source, typically 10 VDC. A common sensitivity of 2 mV/V for a full-bridge configuration at 1000 microstrains would yield 20 microvolts per microstrain. Certain electrical interconnection configurations, moreover, can be implemented to reduce or cancel the effects of transverse or common mode forces or vibration such as longitudinal or horizontal forces applied to typical web tension transducers.

Heretofore, strain gages in such transducers have been mounted onto the inner walls of slots machined out of the transducer body. The body is typically mounted to a stationary fixture using mounting fasteners at the extreme longitudinal ends of the body with a gap between the lower surface of the body and the fixture. The gap allows the transducer body to flex in response to downward forces transmitted by the pillow block. One or more horizontal slots extend laterally through the body, typically near one or both of the longitudinal ends of the body. Strain gages are mounted to the upper and/or lower horizontal surfaces of the slots to sense the flexing of the upper and lower slot walls which are much thinner than the body itself. As downward force is applied to the body, the upper and lower slot walls flex, and the strain gages mounted thereon provide a signal in response from which the amount of force, and hence the web tension, can be determined.

In a typical configuration, two strain gages are mounted longitudinally to the upper slot wall, and two gages are longitudinally mounted to the lower slot wall. The gages are electrically connected in a half-bridge circuit configuration with an external pair of lead wires for excitation power positive and negative connections as well as an output signal connection. An external instrument such as a force monitor or controller provides excitation voltage, typically 10 VDC, to the excitation power lead wires and receives a signal, usually in millivolts, from the signal lead wire. This output signal may then be filtered and/or amplified with the resulting signal being used by other instrumentation to determine the force applied to the mounted transducer body.

As with any measurement transducer, noise immunity in the signal is an important performance feature. This is commonly expressed as the signal to noise ratio S/N, which represents the magnitude of the signal span as compared to the magnitude of the noise. Electrical common and/or normal mode noise from external sources can be superimposed on signal leads, particularly where the instrumentation is remote from the transducer device. The use of shielded twisted pair cables has been successful in reducing such noise. Mechanical common mode noise is also an important problem. Vibration of the transducer body in its longitudinal direction will tend to stretch and compress the strain gages mounted in the longitudinal orientation. Full or half-bridge electrical bridge configurations can effectively cancel such common mode effects where the gages mounted on the upper slot wall are deflected the same amount and in synchronism with those mounted on the lower slot wall. However, quarter-bridge configurations remain susceptible to such mechanical noise disturbances which appear as spurious signals on the transducer output signal lead wires.

The signal to noise ratio can be improved with respect to both mechanical and electrical noise sources by reducing or canceling the noise itself using techniques such as those previously discussed. Heretofore, these efforts have yielded some measure of protection against noise. Alternatively, the signal to noise ratio can also be improved by increasing the level of the strain gage signal, such as by increasing the mechanical deflection of the strain gage per unit of applied force. This can be done by maximizing the distance between the strain gage slot and the pivot points about which the transducer body flexes. In the existing transducers, the gage slots are located at the ends of the body, near the mounting bolts. The moment about the ends of the body is minimal at this location. The corresponding deflection in the strain gages is therefore also minimal. The optimal deflection in existing transducers is at the center of the body where the moment about the end mounting points is maximized. However, there remains a need to provide a web tension transducer with improved signal to noise ratio.

SUMMARY OF THE INVENTION

In accordance with the present invention, there is provided a web tension transducer by which the foregoing and other problems and disadvantages are minimized or overcome. More particularly, and in accordance with the principal aspect of the present invention, there is provided a web tension transducer with a body mounted at opposite longitudinal ends to a stationary fixture, which body pivots about a single horizontal axis near one longitudinal end thereof with strain gages mounted in a single slot located at the opposite longitudinal end. In this respect, the strain gages measure the mechanical deflection of the transducer body at a location where the moment is maximum about the horizontal pivot axis. The strain gage output signal is thereby increased with respect to the prior art devices for a given applied force, consequently improving the signal to noise ratio of the device. All the various strain gage configurations previously available are usable with the present invention, as are the previously discussed cabling techniques. By the arrangement of the present invention, therefore, the immunity against both electrical and mechanical noise has been improved by purely mechanical means.

In accordance with another aspect of the invention, the active part of the transducer is made from a single piece of metal which enables a watertight design.

In accordance with another aspect of the invention, the transducer includes a removable adaptor plate allowing use of the transducer with any number of pillow blocks.

In accordance with yet another aspect of the invention, the transducer body top surface is vertically spaced above the longitudinal end mountings to allow pivotal movement thereof in response to applied downward force.

It is accordingly a primary object of the present invention to provide an improved web tension transducer with increased electrical and mechanical noise immunity.

Another object of the present invention is the provision of a transducer of the character described above which allows use of various strain gage configurations in order to achieve improved noise immunity.

Yet another object of the present invention is the provision of a transducer of the character described above that is watertight.

A further object of the present invention is the provision of a transducer of the character described above which allows the use of a single transducer with a number of different pillow blocks by the provision of an appropriate adaptor plate.

BRIEF DESCRIPTION OF THE DRAWINGS

The foregoing and other objects and advantages will be set forth or will become apparent from the following description of a preferred embodiment of the present invention illustrated in the accompanying drawings in which.

DESCRIPTION OF A PREFERRED EMBODIMENT

Figure 1:
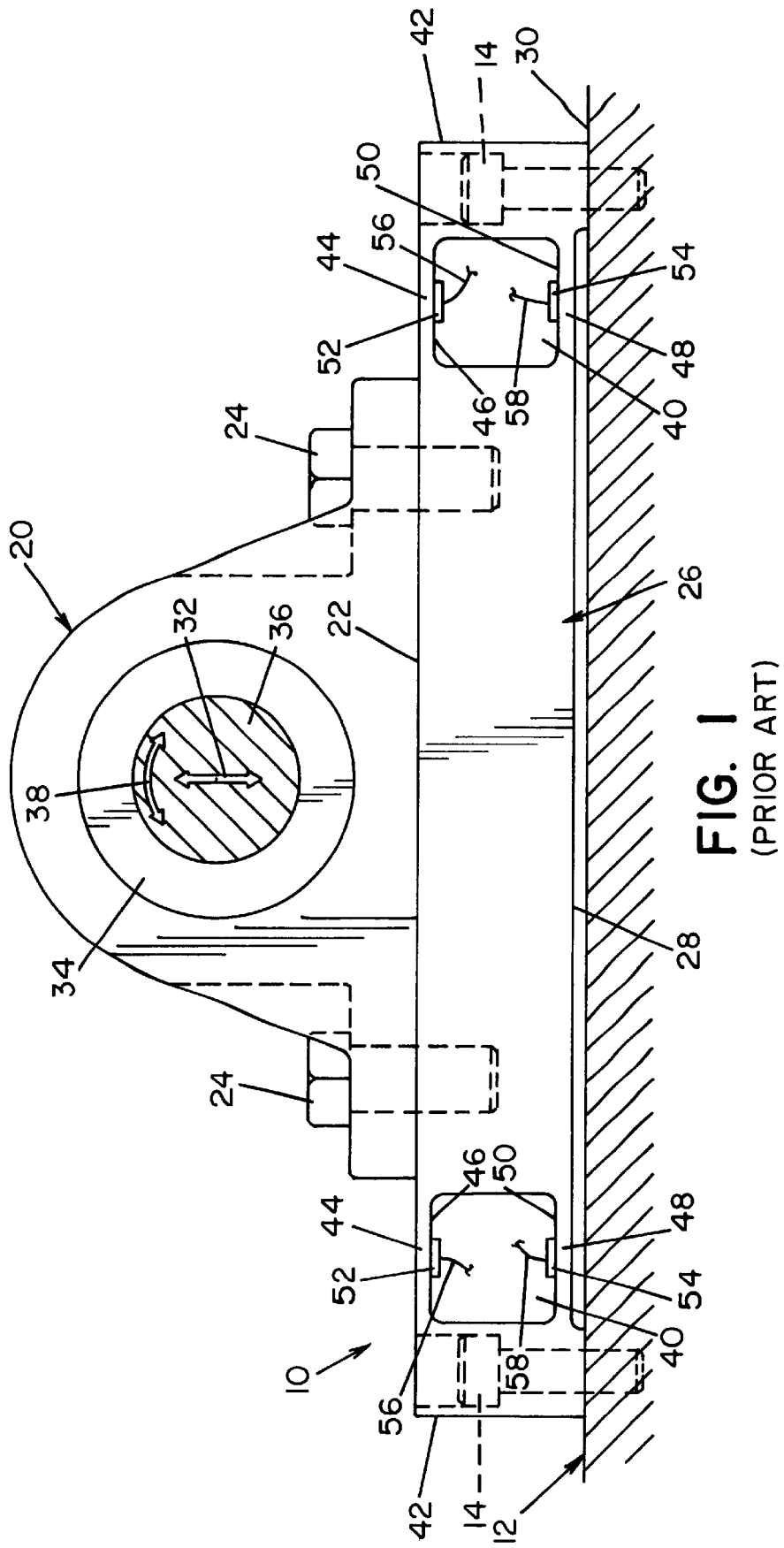
FIG. 1 is a side elevation view of a prior art web tension transducer.

Referring now to the drawings, wherein the showings are for the purpose of illustrating a preferred embodiment of the invention only and not for the purpose of limiting the same, FIG. 1 illustrates a prior transducer 10 mounted on a stationary fixture 12 using bolts 14. A pillow block 20 is mounted on transducer top surface 22 using bolts 24, and transducer body 26 includes a horizontal lower surface 28 vertically spaced from top surface 30 of fixture 12 allowing upward and downward movement of body 26 with respect to fixture 12 in the direction of arrow 32. Pillow block 20 includes a rotary bearing 34 adapted for rotational support of a shaft 36 which, while not shown, supports an idler roll engaging a moving web, not shown, and being rotated thereby in a clockwise or counterclockwise direction as indicated by arrow 38. As typically configured, tension in the web applies a downward force onto shaft 36 which is mechanically transmitted through bearing 34 and pillow block 20 to transducer body 26, thereby causing downward movement of body 26 with respect to fixture 12. Transducer body 26 includes slots 40 located near longitudinal ends 42 of transducer 10 and defining narrow upper slot walls 44 having upper slot surfaces 46 and narrow lower slot walls 48 with lower slot surfaces 50. Strain gages 52 and 54 are respectively mounted on upper and lower slot surfaces 46 and 50. Vertical forces applied to shaft 36 by the web are mechanically transmitted through pillow block 20 to transducer body 26, and these forces cause flexing of narrow upper and lower slot walls 44 and 48, which in turn causes tension or compression of strain gages 52 and 54. Gages 52 and 54 are electrically connected using strain gage wires 56 and 58 to electrical instrumentation, not shown, for measuring the deflection of the strain gages 52 and 54. The electrical connections may be of any configuration, including quarter-bridge, half-bridge, and/or full-bridge implementations of Wheatstone bridge measurement circuits. Using such an arrangement, the vertical forces applied to shaft 36 may be measured and used to indicate and/or control the tension on the web.

Figure 2:
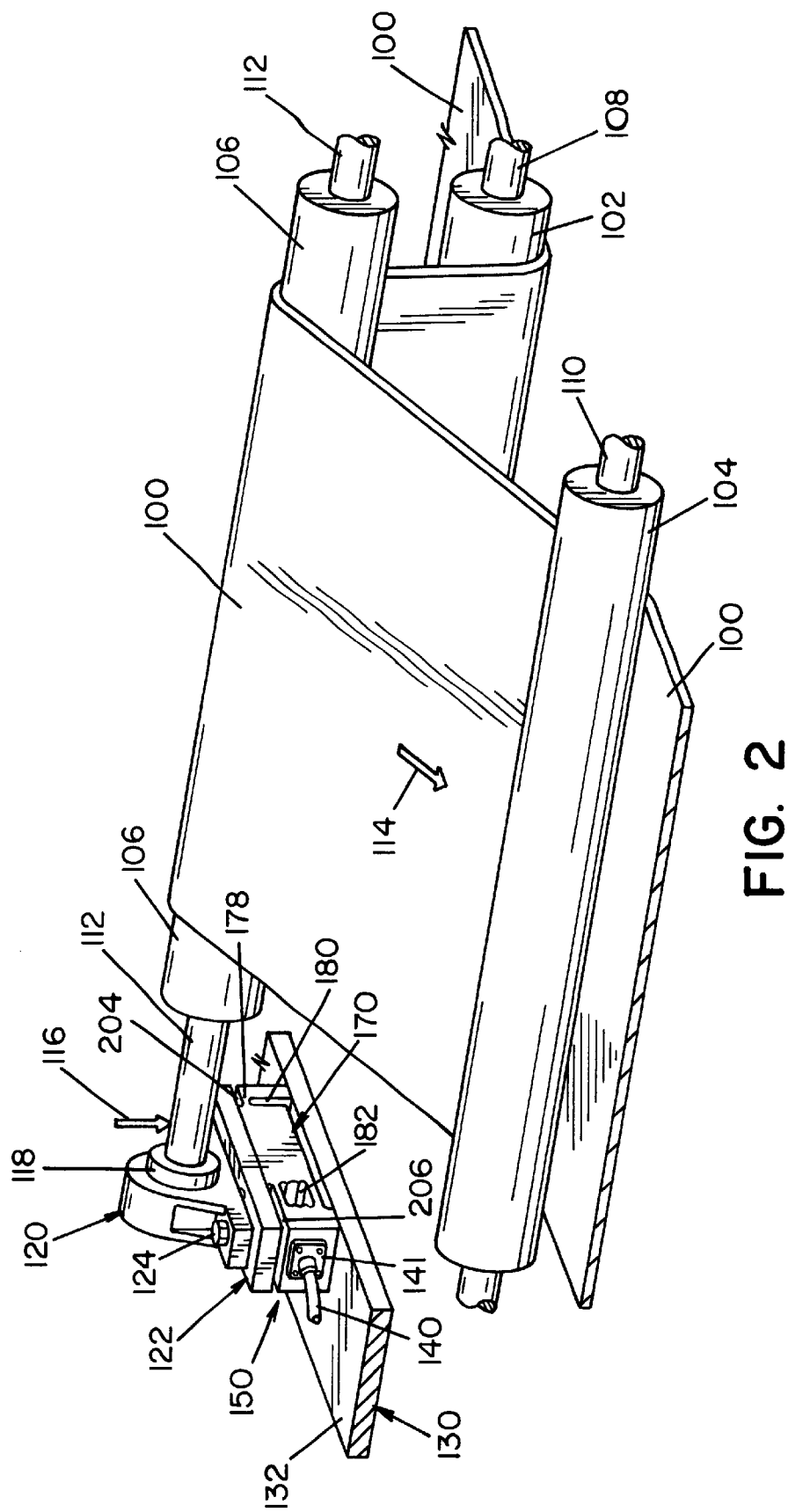
FIG. 2 is a perspective view of a web tension measurement system including a transducer in accordance with the present invention.

FIG. 2 illustrates a typical web tension measurement system including the transducer of the present invention. Web 100 moves under rollers 102 and 104 and over tension measurement roller 106, which rollers have corresponding shafts 108, 110, and 112, respectively. As web 100 moves in the direction shown by arrow 114, a downward force is applied to shaft 112 in the direction shown by arrow 116. Shaft 112 is supported for rotation in bearing 118 of pillow block 120 which is mounted to an adaptor plate 122 using bolts 124. Transducer 150 is mounted between underlying stationary fixture 130 and adapter block 122 for measurement of the vertical forces applied to shaft 112 and hence the tension in web 100, the structural details of which transducer are described further hereinafter. Measurement signals from transducer 150 are fed to monitoring and/or controlling instrumentation, not shown, using cable 140, which is plugged into the connecter 141. The transducer can use a cable but the usual practice is to use a connector 141 mounted on the transducer, into which a cable 140 with a matching plug is connected.

Figure 3:
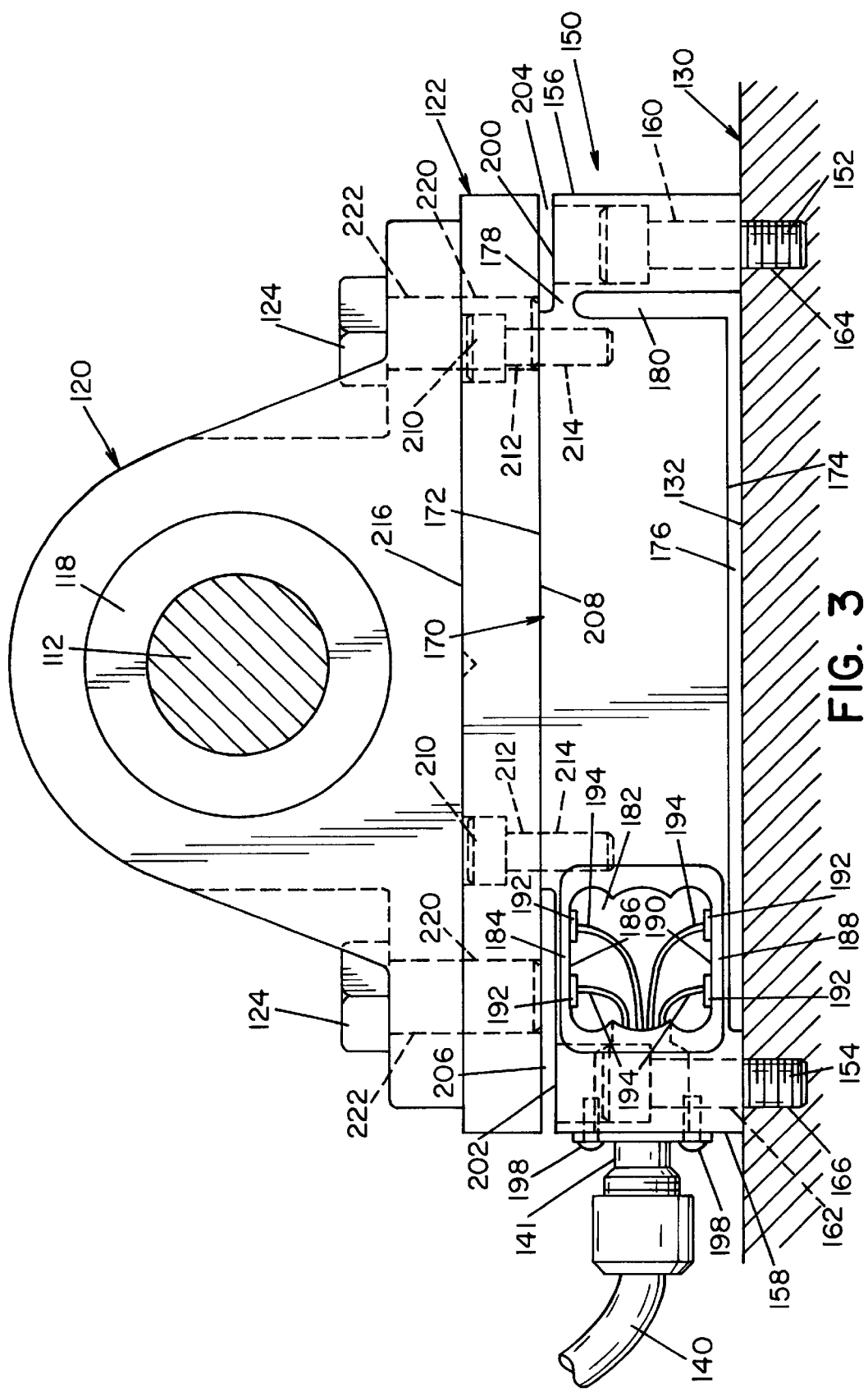
FIG. 3 is a side elevation view of a web tension transducer in accordance with the present invention.
Figure 4:
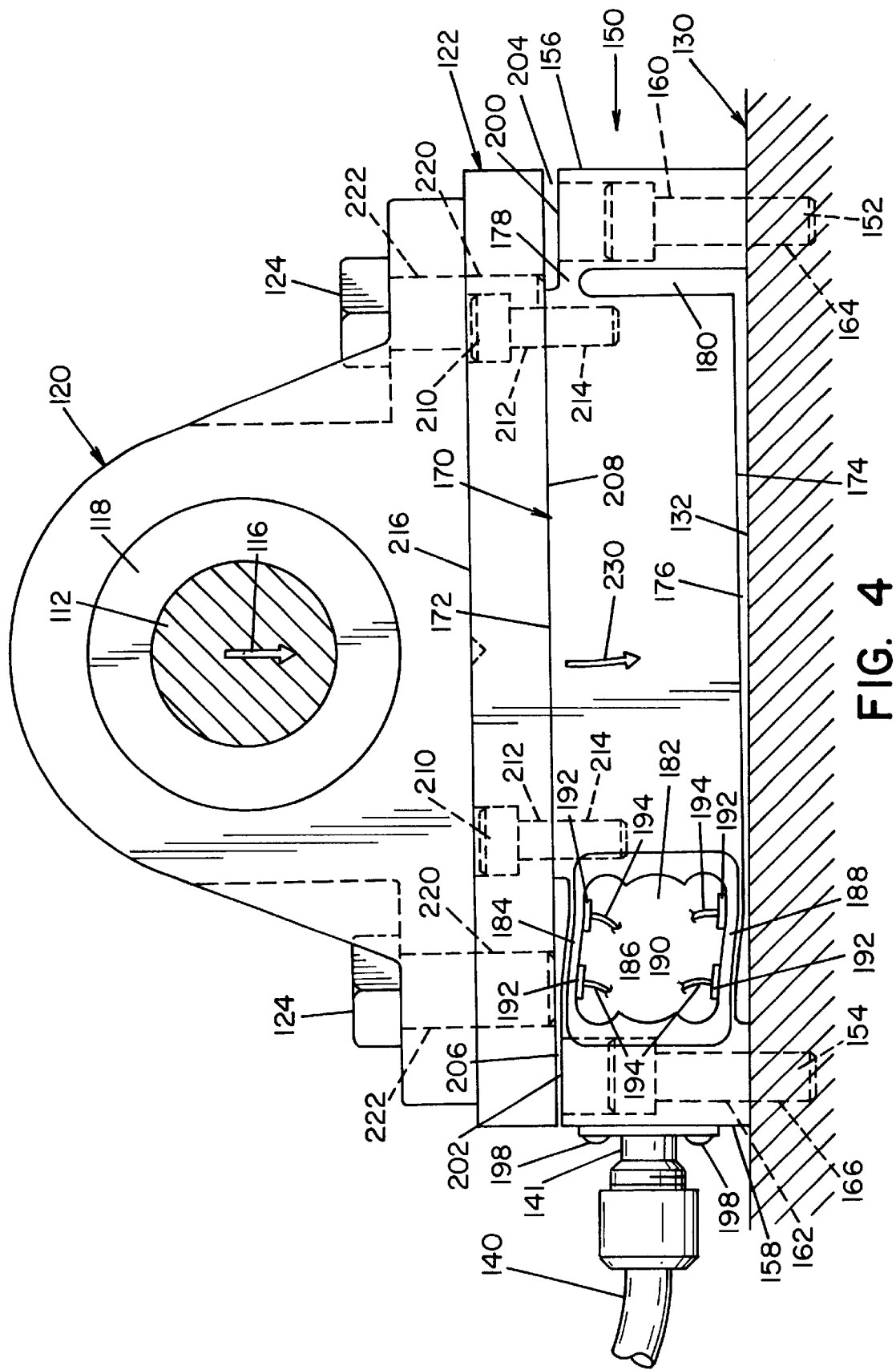
FIG. 4 is a side elevation view similar to FIG. 3 and showing the web tension transducer in an actuated disposition.
Figure 5:
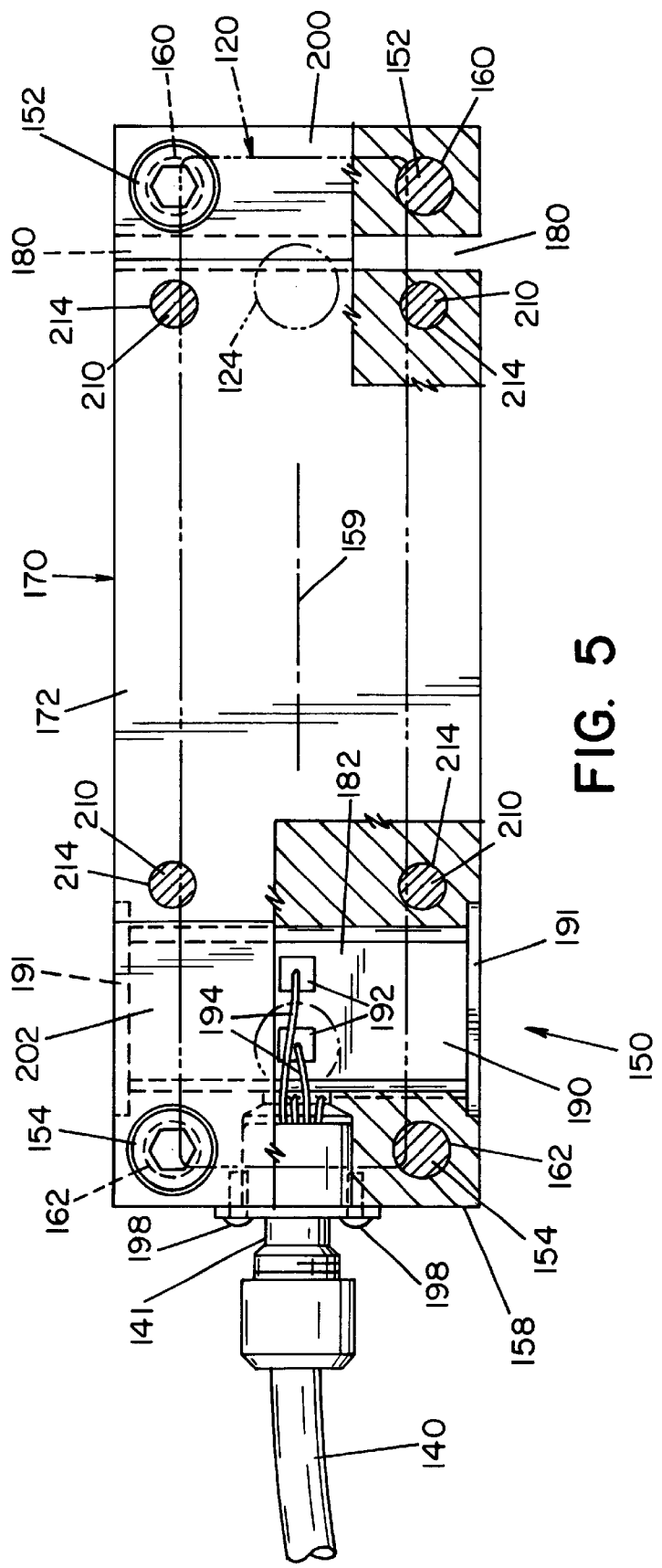
FIG. 5 is a plan view partially in section of the transducer shown in FIG. 3; and, FIG. 6 is a perspective view of the transducer.
Figure 6:
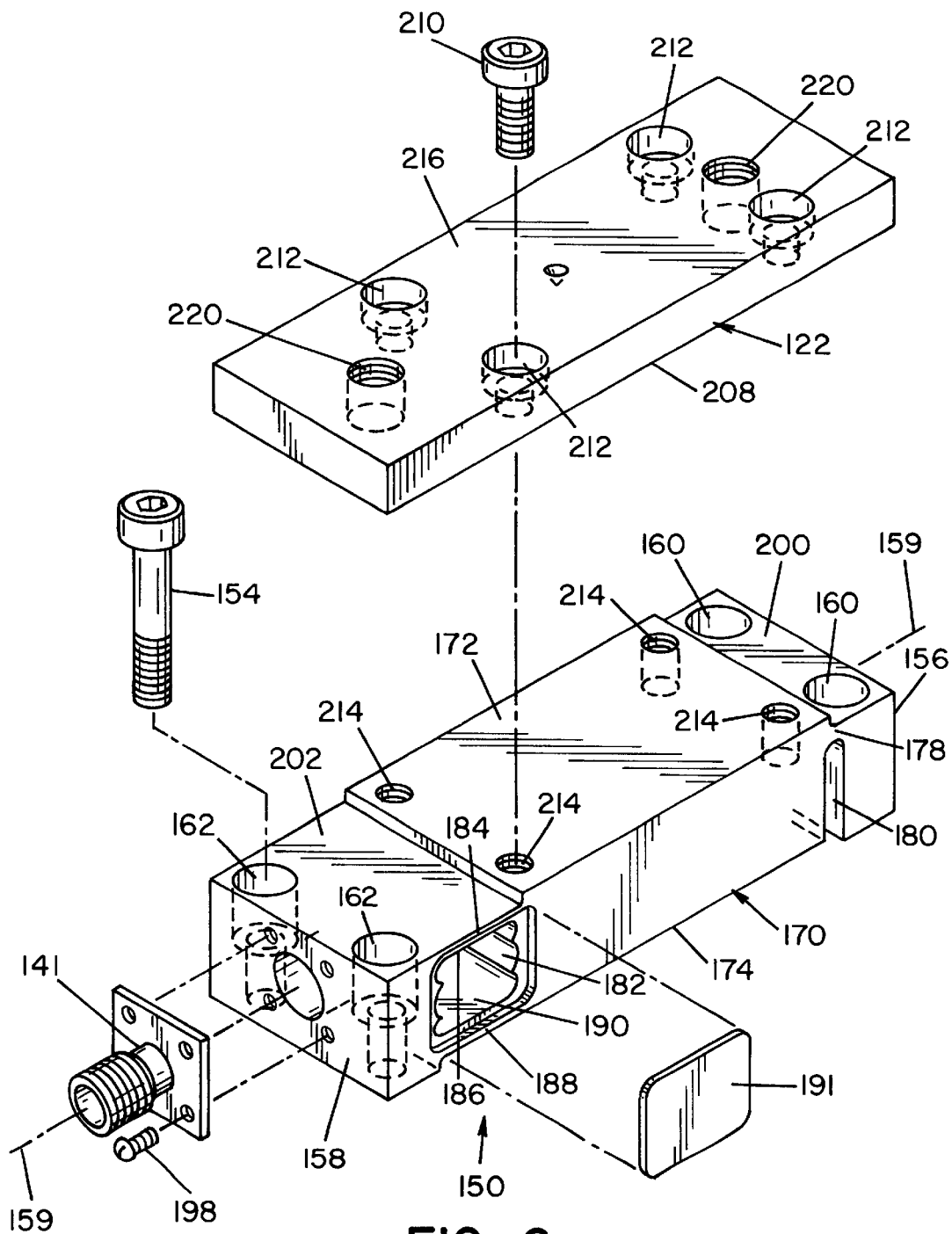

Referring now to FIGS. 3 and 4, a preferred embodiment of transducer 150 is shown mounted on top surface 132 of a stationary fixture 130 using mounting bolts 152 and 154 near longitudinal front and rear ends 156 and 158 of transducer 150 using front and rear holes 160 and 162 provided therefor in transducer 150. Bolts 152 and 154 threadingly engage threaded holes 164 and 166 provided therefor in fixture 130. More particularly, transducer 150 includes a body 170 extending longitudinally between front and rear ends 156 and 158 with a longitudinal axis 159 as shown in FIG. 6, and which is provided with holes 160 and 162 for bolts 152 and 154, respectively, and body 170 has horizontal upper and lower surfaces 172 and 174, respectively. As mounted on fixture 130, lower surface 174 is vertically spaced from fixture upper surface 132 thereby defining a gap 176 therebetween. A transverse vertical slot 180 extends through body 170 upwardly from body lower surface 174 thereby defining a horizontal transverse pivot arm 178. Body 170 is attached near front end 156 for generally vertical pivoting at pivot arm 178. As best seen in FIGS. 5 and 6, body 170 further includes a transverse horizontal slot 182 therethrough located between vertical slot 180 and mounting bolts 154 near rear end 158 and defining a horizontal upper slot wall 184 with horizontal upper slot surface 186 and horizontal lower slot wall 188 with horizontal lower slot surface 190. The ends of slot 182 may be individually closed using cover plates 191 for providing a watertight seal, using adhesives, screws, fasteners, not shown, or by press fitting. Strain gages 192 are mounted to upper and lower slot surfaces 186 and 190 for measurement of compressive and tensile strains thereon caused by the flexing and/or bending of slot walls 184 and 188 as transducer body 170 pivots generally vertically about the horizontal axis of pivot arm 178. Strain gage wires 194 are electrically connected to strain gages 192 for connection to instrumentation and/or process controls, not shown, through cable 140 which is plugged into connector 141 mounted onto transducer 150 using fasteners 198. The electrical connection of strain gages 192 using wires 194 and cable 140 may be in such fashion as to implement any of a number of interconnection schemes or configurations such as quarter-bridge, half-bridge, and/or full-bridge adaptations of a Wheatstone bridge measurement circuit. Excitation voltage is applied to the strain gage interconnection system by the instrumentation and/or controls, not shown, as is known. Body 170 has a front upper surface 200 and rear upper surface 202, both of which are vertically spaced below transducer body upper surface 172 thereby defining a front gap 204 and a rear gap 206 between transducer 150 and the lower horizontal surface 208 of adapter plate 122 and which gaps serve the purpose set forth more fully hereinafter.

Referring further to FIG. 6, adapter plate 122 is mounted on top surface 172 of transducer body 170 using bolts 210 passing through holes 212 in plate 122 and threadingly engaging in holes 214 provided therefor in transducer body 170. Adapter plate 122 further includes threaded holes 220 threadingly engaged by pillow block mounting bolts 124 for mounting pillow block 120 on adapter plate top surface 216. Variants of adapter plate 122 are contemplated as within the invention wherein holes 212 are located for cooperative alignment with transducer body holes 214 such that many different adapter plates 122 are usable with transducer 150 and wherein adapter plate holes 220 are variously located on different variants of adapter plate 122 for cooperative alignment with mounting holes of various pillow blocks. Pillow block mounting bolts 124 pass through holes 222 in pillow block 120 and threadingly engage adapter plate holes 220, thereby mounting pillow block 120 to adapter plate 122 for transmission of vertical forces from shaft 112 to transducer 150. Pillow blocks having holes such as holes 222 cooperatively aligned with corresponding threaded holes in body 170 may alternatively be mounted directly onto top surface 172 using bolts, not shown, engaging holes such as threaded holes 214 in body 170 without using adapter plate 122.

Referring now to FIGS. 2 and 4, as a force is applied downwardly on shaft 112 in the direction of arrow 116 according to the tension in web 100 passing over roller 106, the force is transmitted through pillow block 120 and adapter plate 122 to transducer body 170 which is thereby pivoted at pivot arm 178 in the direction of arrow 230 in FIG. 4. This pivotal movement of body 170 is enabled by gaps 176 and 206 and causes bending of upper and lower slot walls 184 and 188 into an ogee bend. The bending of walls 184 and 188 in turn causes mechanical deflection of strain gages 192 and, consequently, electrical signals are generated from the interconnected electrical configuration thereof which signals are indicative of the applied force on shaft 112. The aforementioned instrumentation and/or process control equipment, not shown, can advantageously use this electrical signal as an indication of the tension in web 100 for control and/or monitoring purposes.

As many possible embodiments of the present invention may be made and as many possible changes may be made in the embodiment set forth herein, it is to be distinctly understood that the foregoing descriptive matter is to be interpreted merely as an illustration of one or more specific embodiments of the invention, and not as a limitation thereof. It is applicant's intent to include all embodiments within the scope of the accompanying claims and all equivalents thereof.

What is claimed is:

1. A transducer for generating an electrical signal representative of mechanical forces applied to a roll by a web passing over and rotating said roll about a first axis with respect to a stationary fixture, said transducer comprising:

a body having longitudinally opposite first and second ends and having a longitudinal axis between said first and second ends, a top surface extending between said first and second ends, a bottom surface extending between said first and second ends, a cavity in said body positioned near said second end and transverse to said longitudinal axis, and a pivot arm means positioned at least closely adjacent said first end for enabling pivotal movement of said body and the roll about a single second axis transverse to said longitudinal axis, said bottom surface at least partially positioned above said stationary fixture, first mounting means for mounting said body to said stationary fixture at said first end for said pivotal movement about said second axis, second mounting means for mounting said body to said fixture at said second end, said pivot arm means being between said first and second mounting means, third mounting means for mounting said roll on said top surface of said body for said first axis to be generally parallel to said second axis, and strain gage means positioned only near said second end, said strain gage means being at least partially mounted in said cavity for generating electrical signals representative of forces applied to said roll in response to said pivotal movement of said body about said second axis.

2. The transducer of claim 1, wherein said first and second mounting means include vertical holes for receiving bolts threadingly engaging holes in said fixture.

3. The transducer of claim 1, wherein said third mounting means includes threaded mounting holes extending through said top surface and into said body.

4. The transducer of claim 1, wherein said third mounting means is removably mounted on said top surface.

5. The transducer of claim 1, wherein said first mounting means is integral with said body and said body further includes a transverse slot near said first end and perpendicular to said bottom surface, said slot extending through said bottom surface toward said top surface and defining a pivot wall between said slot and said top surface, and said pivot wall providing said pivot arm means.

6. The transducer of claim 1, wherein said cavity is a slot extending transversely in said body defining a flexible upper cavity wall near said top surface and a flexible lower cavity wall near said bottom surface.

7. The transducer of claim 6, wherein said cavity extends transversely through said body.

8. The transducer of claim 6, wherein said first mounting means is integral with said body and said body further includes a transverse slot in said body near said first end and perpendicular to said bottom surface, said slot extending through said bottom surface toward said top surface and defining a pivot wall between said slot and said top surface, and said pivot wall providing said pivot arm means.

9. The transducer of claim 6, wherein said strain gage means includes a strain gage mounted on said upper cavity wall to provide electrical signals in response to flexing of said upper cavity wall.

10. The transducer of claim 9, wherein said cavity extends transversely through said body.

11. The transducer of claim 6, wherein said strain gage means includes a strain gage mounted on said lower cavity wall to provide electrical signals in response to flexing of said lower cavity wall.

12. The transducer of claim 11, wherein said strain gage means further includes a strain gage mounted on said upper cavity wall to provide electrical signals in response to flexing of said upper cavity wall.

13. The transducer of claim 12, wherein said cavity extends transversely through said body.

14. The transducer of claim 13, wherein said first mounting means is integral with said body and said body further includes a transverse slot in said body near said first end and perpendicular to said bottom surface, said slot extending through said bottom surface toward said top surface and defining a pivot wall between said slot and said top surface, and said pivot wall providing said pivot arm means.

15. The transducer of claim 14, wherein said third mounting means includes threaded mounting holes extending through said top surface and into said body.

16. The transducer of claim 14, wherein said third mounting means is removably mounted on said top surface.

17. The transducer of claim 12, wherein said first mounting means is integral with said body and further including a transverse slot in said body near said first end perpendicular to said bottom surface, said slot extending through said bottom surface toward said top surface and defining a pivot wall between said slot and said top surface, said pivot wall providing said pivot arm means.

18. The transducer of claim 11, wherein said cavity extends transversely through said body.

19. A transducer for generating an electrical signal representative of mechanical forces applied to a roll by a web passing over and rotating said roll about a first axis with respect to a stationary fixture, said transducer comprising a body having longitudinally opposite first and second ends and having a longitudinal axis between said first and second ends, a top surface extending between said first and second ends, a bottom surface extending between said first and second ends, a cavity in said body positioned near said second end and transverse to said longitudinal axis, a pivot arrangement enabling pivotal movement of said body and the roll about a single axis between said first and second ends, said bottom surface at least partially positioned above said stationary fixture a body mounting arrangement mounting said body to said stationary fixture a roll mounting arrangement mounting said roll on said body such that said first axis is non-parallel to said longitudinal axis and a strain gage arrangement at least partially mounted in said cavity to at least partially generate at least one electrical signal representative of forces applied to said roll in response to said pivotal movement of said body about said pivot arrangement, said strain gage arrangement including at least one strain gage.

20. The transducer of claim 19, wherein said pivot arrangement having a single pivot arm.

21. The transducer of claim 20, wherein said pivot arm is positioned at least closely adjacent said first end.

22. The transducer of claim 20, wherein said pivot arm is positioned at least closely adjacent said top surface.

23. The transducer of claim 20, including a slot, said slot extending from said pivot arm to said bottom surface and forming an opening in said bottom surface.

24. The transducer of claim 23, wherein at least a portion of said slot extends the full transverse axis of said body.

25. The transducer of claim 24, wherein said slot has a width that reduces in size when said body pivots on said pivot arm.

26. The transducer of claim 23, wherein said slot has a width that reduces in size when said body pivots on said pivot arm.

27. The transducer of claim 23, wherein said slot has a substantially uniform width which extends substantially perpendicular from said bottom surface.

28. The transducer of claim 19, wherein said pivot arrangement is positioned at least closely adjacent said first end.

29. The transducer of claim 19, wherein all of said strain gages are positioned at least closely adjacent to said cavity.

30. The transducer of claim 29, wherein all of said strain gages are positioned in said cavity.

31. The transducer of claim 19, wherein said roll mounting arrangement is removably mounted on said body.

32. The transducer of claim 31, wherein said roll mounting arrangement is mounted on said top surface of said body.

33. The transducer of claim 19, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said second end of said body, said roller mount being mounted to the top surface of said body mount.

34. The transducer of claim 33, wherein one end of said roller mount being mounted to the top surface of said body mount above said mount gap.

35. The transducer of claim 34, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said first end of said body, said roller mount being mounted to the top surface of said body mount.

36. The transducer of claim 19, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said first end of said body, said roller mount being mounted to the top surface of said body mount.

37. The transducer of claim 19, wherein said body mounting arrangement is removably mounted on said stationary fixture.

38. The transducer of claim 19, wherein said cavity is a bore extending transversely in said body defining a flexible upper cavity wall near said top surface and a flexible lower cavity wall near said bottom surface.

39. The transducer of claim 38, wherein said cavity extends transversely through said body.

40. The transducer of claim 38, wherein at least one strain gage is mounted on said upper cavity wall to provide electrical signals in response to flexing of said upper cavity wall.

41. The transducer of claim 40, wherein at least one strain gage is mounted on said lower cavity wall to provide electrical signals in response to flexing of said lower cavity wall.

42. The transducer of claim 38, wherein at least one strain gage is mounted on said lower cavity wall to provide electrical signals in response to flexing of said lower cavity wall.

43. A transducer for generating an electrical signal representative of mechanical forces applied to a roll by a web passing over and rotating said roll about a first axis with respect to a stationary fixture, said transducer comprising a body having longitudinally opposite first and second ends and having a longitudinal axis between said first and second ends, a top surface extending between said first and second ends, a bottom surface extending between said first and second ends, a cavity in said body positioned near said second end and transverse to said longitudinal axis, a strain gage arrangement, a body mounting arrangement, and a roll mounting arrangement, said bottom surface at least partially positioned above said stationary fixture, said body mounting arrangement mounting said body to said stationary fixture, said roll mounting arrangement mounting said roll on said body such that said first axis is non-parallel to said longitudinal axis, said strain gage arrangement generating at least one electrical signal representative of forces applied to said roll in response to said roll applying a force to said body, said strain gage arrangement including at least one strain gage, all of said strain gages being positioned in said cavity.

44. The transducer of claim 43, wherein said cavity is a bore extending transversely in said body defining a flexible upper cavity wall near said top surface and a flexible lower cavity wall near said bottom surface.

45. The transducer of claim 44, wherein said cavity extends transversely through said body.

46. The transducer of claim 44, wherein at least one strain gage is mounted on said upper cavity wall to provide electrical signals in response to flexing of said upper cavity wall.

47. The transducer of claim 46, wherein at least one strain gage is mounted on said lower cavity wall to provide electrical signals in response to flexing of said lower cavity wall.

48. The transducer of claim 44, wherein at least one strain gage is mounted on said lower cavity wall to provide electrical signals in response to flexing of said lower cavity wall.

49. The transducer of claim 43, including a pivot arrangement enabling pivotal movement between said first and second ends of said body.

50. The transducer of claim 49, wherein said pivot arrangement having a single pivot arm.

51. The transducer of claim 50, wherein said pivot arm is positioned at least closely adjacent said first end.

52. The transducer of claim 51, wherein said pivot arm is positioned at least closely adjacent said top surface.

53. The transducer of claim 52, including a slot, said slot extending from said pivot arm to said bottom surface and forming an opening in said bottom surface.

54. The transducer of claim 53, wherein at least a portion of said slot extends the full transverse axis of said body.

55. The transducer of claim 50, including a slot, said slot extending from said pivot arm to said bottom surface and forming an opening in said bottom surface.

56. The transducer of claim 55, wherein said slot has a width that reduces in size when said body pivots on said pivot arm.

57. The transducer of claim 56, wherein said slot has a substantially uniform width which extends substantially perpendicular from said bottom surface.

58. The transducer of claim 49, wherein said pivot arrangement is positioned at least closely adjacent said first end.

59. The transducer of claim 58, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said second end of said body, said roller mount being mounted to the top surface of said body mount.

60. The transducer of claim 59, wherein one end of said roller mount being mounted to the top surface of said body mount above said mount gap.

61. The transducer of claim 60, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said first end of said body, said roller mount being mounted to the top surface of said body mount.

62. The transducer of claim 58, wherein said roll mounting arrangement includes a body mount plate and a roller mount, said body mount plate having a top and a bottom surface, said bottom surface of said body mount being mounted to said body between said pivot arrangement and said at least one strain gages, said body mount forming a mount gap between said body and said body mount at least closely adjacent said first end of said body, said roller mount being mounted to the top surface of said body mount.

63. The transducer of claim 43, wherein said roll mounting arrangement is removably mounted on said top surface.

64. The transducer of claim 43, wherein said body mounting arrangement is removably mounted on said stationary fixture.

* * * * *